Hall & Merrick.
Thread Dressing Mach.
N°29,690. Patented Aug. 21, 1860.

Witnesses.
J. B. Carpenter
J. S. Parker

Inventors.
Origin Hall
Timothy Merrick

UNITED STATES PATENT OFFICE.

ORIGIN HALL AND TIMOTHY MERRICK, OF WEST WILLINGTON, CONNECTICUT.

MACHINE FOR DRESSING AND POLISHING THREAD.

Specification forming part of Letters Patent No. 29,690, dated August 21, 1860; Reissued November 16, 1869, No. 3,734.

*To all whom it may concern:*

Be it known that we, ORIGIN HALL and TIMOTHY MERRICK, of West Willington, in the county of Tolland and State of Connecticut, have invented certain new and useful Improvements in Machinery for Dressing and Finishing Sewing-Thread or other Threads or Yarns; and we do hereby declare that the following is a full, clear, and exact description of the same, reference being had to the accompanying drawings, forming part of this specification, in which—

Figure 1:
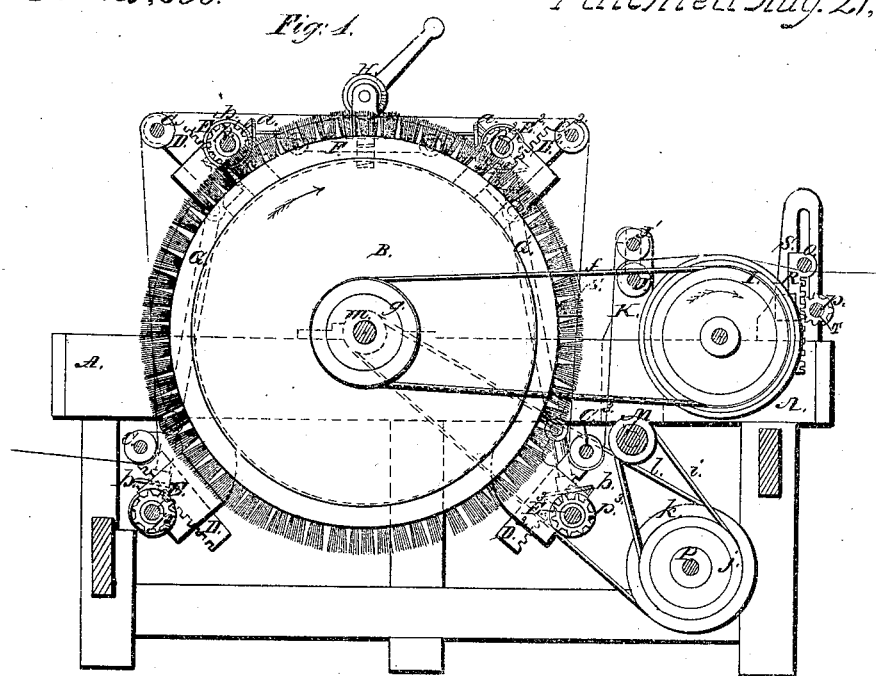
Figure 3:
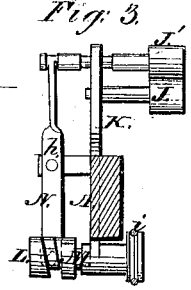
Figure 2:
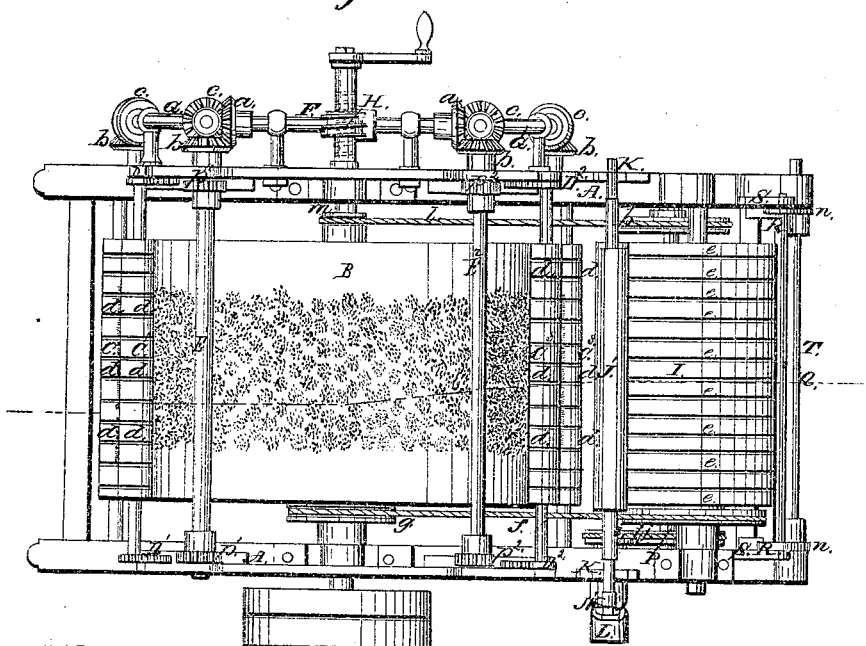

Figure 1, is a longitudinal vertical section taken just within one of the side frames of a machine exhibiting all our improvements. Fig. 2, is a plan of the same. Fig. 3, is a transverse elevation of a portion of the machine.

Similar letters of reference indicate corresponding parts in the several figures.

To enable those skilled in the art to make and use our invention we will proceed to describe its construction and operation.

A, is the framing of the machine.

B is the brush cylinder whose journals are fitted to turn in suitable bearings supported on the said framing.

C, C', C², C³, are rollers, which conduct the thread, as it comes from the size boxes, into contact with the brush cylinder, said rollers being at equal distances apart near to the cylinders and parallel therewith. The sizing apparatus is not shown but a thread is shown in red color in Figs. 1 and 2. The rollers derive motion from the friction of the thread passing in contact with them. The threads pass under the roller C, over those C', and C², and under C³, and by that means each thread is caused to come in contact with the cylinder in three places, and to be operated upon by the cylinder three times. The said rollers have their journals fitted to bearings in slides D, D', D², D³, fitted to suitable guides in the framing and the said slides are provided with toothed racks to gear with pinions $p, p', p^2, p^3$, on four shafts E, E', E², E³, for the purpose of enabling the said rollers to be adjusted farther from or nearer to the cylinder that the thread may enter more or less deeply into the brushes as may be desired. These shafts E, E', E², E³, are geared together by a train of shafts F, G, G¹, and bevel gearing $a, a, b, b, c, c,$ that all may be operated simultaneously by turning an endless screw shaft H, which gears with a worm wheel on the shaft F. The several rollers C, C', C², C³, have at regular and suitable intervals apart, small grooves $d, d,$ to receive and guide the threads; the threads are not permitted to pass directly from the grooves in one roller to the grooves in the next one, in lines parallel with the planes of the cylinders revolution, but caused to pass to grooves not directly opposite to those which they are leaving, and hence are prevented making a series of wet streaks in the brushes, and leaving other parts untouched, and are caused to bring every portion of the brush into operation and thus prevent any part becoming wet or damp enough to interfere with the success of the operation. This mode of directing the threads is illustrated in Fig. 2. The thread in leaving one roller is caused by the action of the brushes at the next place of contact to assume between that roller and said place of contact a line parallel with the planes of revolution of the cylinder but from said place of contact to the next roller it takes an oblique direction as shown in Fig. 2.

I, is the polishing cylinder having its journals fitted to stationary bearings supported on the frame A, said cylinder being made of metal, hollow, and being heated by steam admitted through hollow journals in the manner common to calender rollers, and having small well polished grooves $e, e,$ in its periphery to receive the threads which are conducted to and in contact with the said cylinder on their way from the brush cylinder to the spools or other contrivances by which they are taken up. This cylinder is driven by a belt $f$, from a pulley $g$, on the shaft of the brush cylinder, at such a velocity that its peripherical surface moves much faster than the threads passing over it; and by the friction of its rapidly moving smooth surface upon the threads, which are not quite dry when they arrive at it, dries and gives them a beautiful polish or glaze. By having grooves ($e$) upon the cylinder I, each thread will be kept separate and at the same time a much larger proportion of the surface of the thread will be exposed to the action of the heat, than if the rollers were plain or had no grooves, as in ordinary thread dressing machines.

J, J', are a pair of plain rollers between which the threads pass on their way from the brush cylinder B, to the polishing cylinder I, the lower roller J, being fitted to stationary bearings in standards K, K, erected on the framing A, and the upper one J', resting on J, and having its journals simply fitted to guides in the aforesaid standards. The pressure produced by the upper roller J', should be sufficient to make the thread turn both rollers as it is drawn between them. The upper roller J', has imparted to it a regular reciprocating longitudinal motion while the machine is in operation by means of a cam L, (best shown in Fig. 3,) on a short shaft M, fitted to rotate in a stationary box some distance below the rollers J, J', the said cam operating upon the lower end of a lever N, which works on a fixed fulcrum $h$, and whose upper end is forked and fitted to a groove in the axle of the roller J'. The reciprocating motion thus given to the said roller J', while the lower one J, has no longitudinal motion, causes the thread to receive a rapid rolling motion while it is passing in contact with the surface of the polishing cylinder, and this rolling motion of the thread causes every portion of its circumferential surface to be presented to the action of the surface of the cylinder. The cam shaft M, is driven by a belt $i$, from a pulley $j$ on a shaft P, arranged below the polishing cylinder, said shaft P, having another pulley $k$, which receives the motion through a belt $l$, from a pulley $m$, on the brush cylinder shaft, which is the shaft from which all the moving parts of the machine except, the rollers which are driven by the friction of the thread, derive motion.

Q, is a roller which assists the rollers J, J', to confine the threads to the surface of the polishing cylinder, and conducts the threads therefrom to the spools or other contrivances (not shown in the drawing) on which they are taken up, said roller having its journals fitted to bearings in two slides R, R, which are fitted to guides in two standards S, S, erected on the front end of the frame A, A. The slides R, R, are furnished with toothed racks to gear with pinions $n, n$, on a shaft T, which works in fixed bearings in the standards S, S; and the said shaft is furnished with a handle by which it can be turned to raise and lower the slides R, R, and roller Q, to make the threads bear upon a less or greater portion of the circumference of the polishing cylinder as may be found desirable.

What we claim as our invention and desire to secure by Letters Patent is—

1. The employment of grooves ($e$) upon the hot polishing cylinder I, so that an increased extent of thread surface will be exposed to the heat of the cylinder as herein set forth.

2. The combination of the four adjustable grooved conducting rollers C, C', $C^2$, $C^3$, with the brush cylinder B, as and for the purpose herein shown and described.

3. The combination of the adjustable rack toothed slides R, R, pinions T, roller Q, standards S, and cylinder I, as and for the purpose herein shown and described.

ORIGIN HALL.
TIMOTHY MERRICK.

Witnesses:
J. B. CARPENTER,
J. S. PARKER.